United States Patent [19]

Mignien et al.

[11] Patent Number: 4,664,471
[45] Date of Patent: May 12, 1987

[54] JUNCTION BOX FOR JOINING THE ENDS OF UNDERWATER OPTICAL FIBER CABLES BY WELDING

[75] Inventors: Georges Mignien, Leulinghen Bernes; Didier Fasquel, Calais, both of France

[73] Assignee: Les Cables de Lyon, Cedex, France

[21] Appl. No.: 650,154

[22] Filed: Sep. 13, 1984

[30] Foreign Application Priority Data

Sep. 16, 1983 [FR] France .................................. 83 14765

[51] Int. Cl.⁴ ............................................... G02B 6/36
[52] U.S. Cl. .............................. 350/96.21; 350/96.10; 350/96.22
[58] Field of Search ............... 350/96.15, 96.20, 96.21, 350/96.22, 96.23; 174/68 R, 70 S, 72 C, 70

[56] References Cited

U.S. PATENT DOCUMENTS

| 4,412,878 | 11/1983 | Guazzo | 350/96.21 X |
| 4,494,822 | 1/1985 | Harvey | 350/96.23 X |
| 4,516,830 | 5/1985 | Guazzo | 350/96.20 X |

FOREIGN PATENT DOCUMENTS 2506031 11/1982 France .............................. 350/96.23

OTHER PUBLICATIONS

Journal of Optical Communications, 1980, "Characteristics of Jelly-Filled Optical Cables" by H. Horima et al, pp. 58-63.

Primary Examiner—William L. Sikes
Assistant Examiner—Akm E. Ullah
Attorney, Agent, or Firm—Sughrue, Mion, Zinn, Macpeak & Seas

[57] ABSTRACT

Junction box for joining the ends of two underwater optical fiber cables by welding, comprising two clamps 1, 2 connected by a tubular sleeve 3, and a central hollow mandrel 17 for securing the welds, wherein said mandrel comprises a slack chamber 15, 16 in between each clamp and one end of the mandrel. Such junction boxes are mainly for use in the junction of underwater telecommunication cables.

5 Claims, 2 Drawing Figures

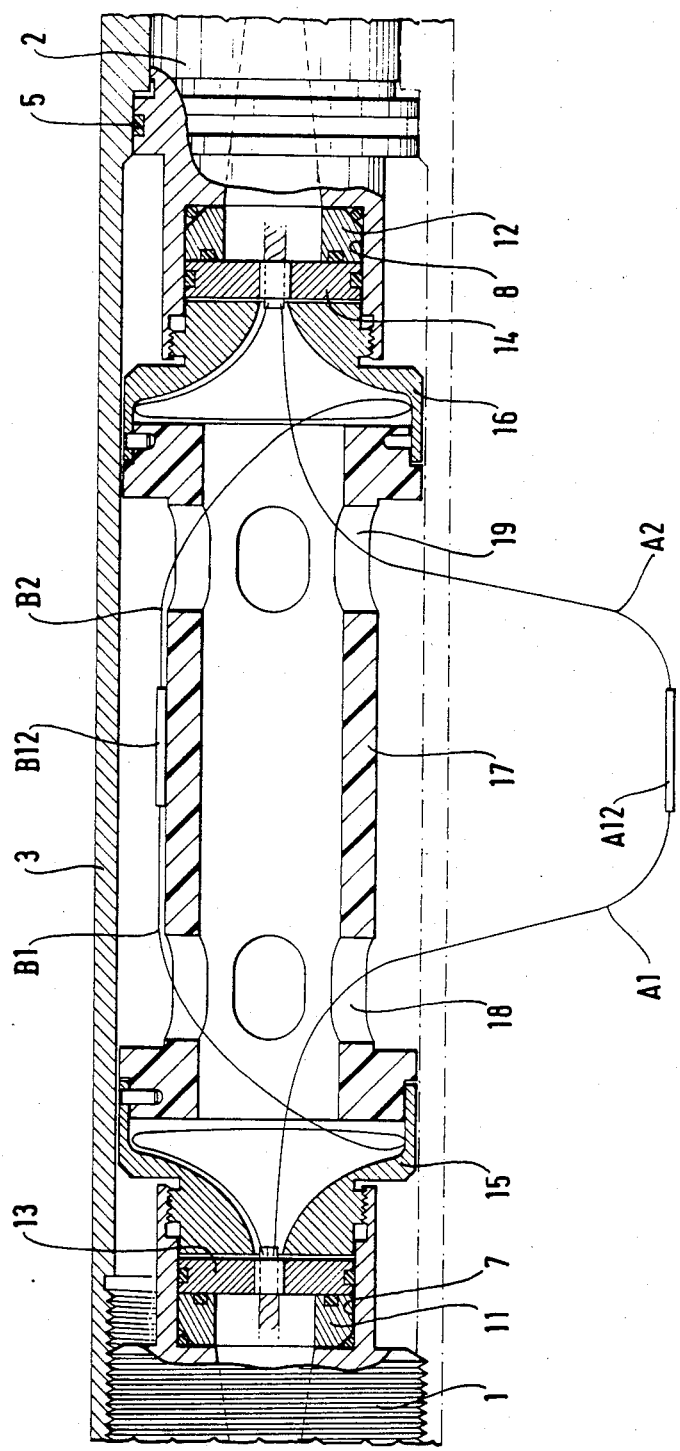

JUNCTION BOX FOR JOINING THE ENDS OF UNDERWATER OPTICAL FIBER CABLES BY WELDING

FIELD OF THE INVENTION

This invention relates to joining the ends of two underwater optical fiber cables by welding.

BACKGROUND OF THE INVENTION

In general, making a weld or series of welds for joining together the two ends of optical fibers requires a great length of fiber. Once the weld is completed, it is necessary to absorb the excess length without it resulting in too small radius bends.

Junction boxes are known, notably through U.S. Pat. No. 4,516,830, comprising two end anchor parts and one central mandrel receiving the excess length of fiber. The fibers are welded, then wound round the mandrel and the welds are secured to the mandrel. In this way the fibers are totally secured, which renders them liable to snap upon the slightest tension being exerted. Moreover, the device calls for filling with a viscous and/or water-repellent product for protecting the fibers against moisture.

The purpose of this invention is to submit a junction and/or repair box provided with slack chambers for receiving the excess lengths of fiber. The welds are secured to the mandrel but the fibers are still free to move. This junction box furthermore is effectively watertight without mandatorily having recourse to fill products.

SUMMARY OF THE INVENTION

This invention covers the use of a junction box for joining two underwater optical fiber cables by welding, comprising two members clamping one end of a cable connected by a waterproof pipe sleeve, and a central hollow mandrel for securing the welds, said mandrel having ports at its two ends for threading through the optical fibers from inside to outside, whereby the junction box comprises a slack chamber in between each clamping member and one end of the mandrel, the internal portion of each clamping member having a cylindrical cavity provided with clamping devices for receiving a slack member.

The securing devices are preferably screw threads, and a longitudinal sealing passage located adjacent each slack chamber in each clamping member. Typically, such a seal may be designed to withstand a pressure of 700 bar. In the event of cable failure at any point whatsoever, moisture will not spread beyond the watertight passage.

Embodiments of a junction box according to the invention will now be described by way of example only with reference to the following drawings.

BRIEF DESCRIPTION OF THE DRAWINGS

FIG. 2 is an enlarged sectional view of portion II in FIG. 1.

DESCRIPTION OF THE PREFERRED EMBODIMENT

Figure 1:
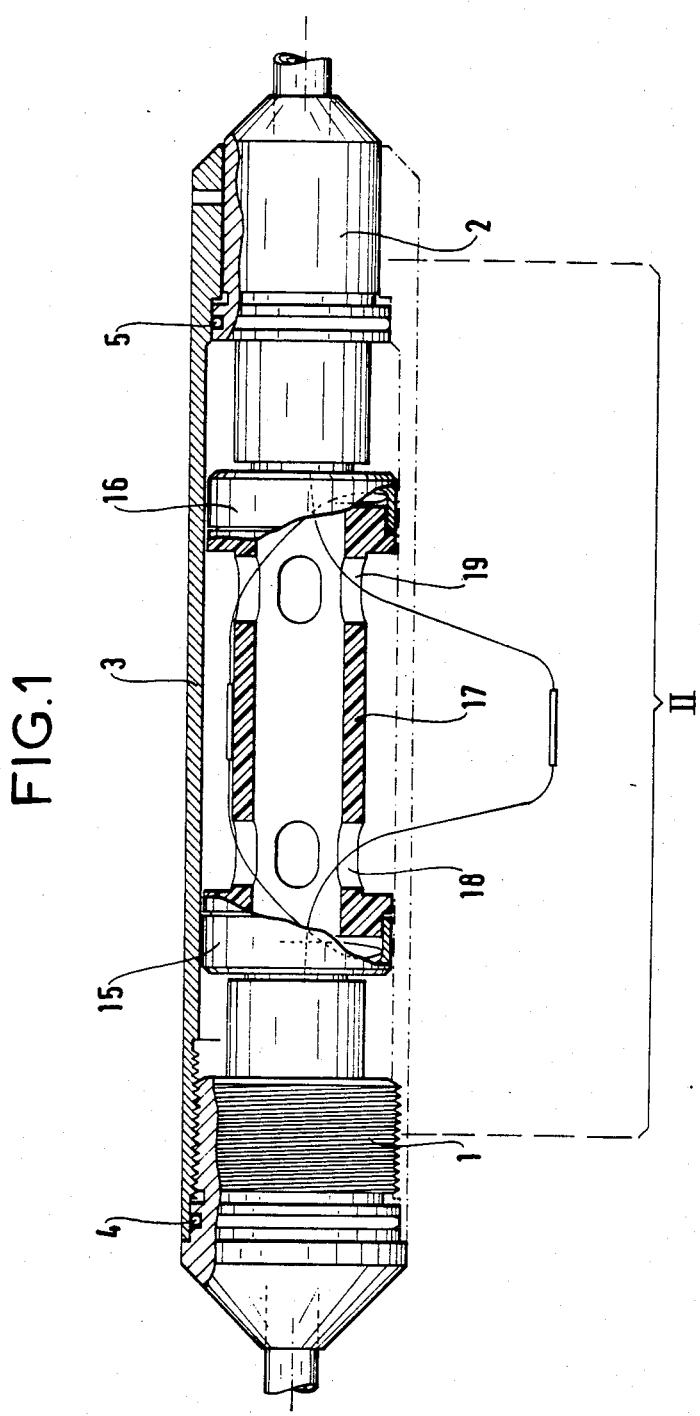
FIG. 1 is a sectional view, partially broken away, of a junction box according to the invention.

FIG. 1 of the drawing shows sectional portions illustrating in the top half-part, a sleeve. 3 enclosing the junction, and in its bottom half-part, the junction on completion of the welding operations prior to the insertion of sleeve 3.

At each end, the junction box comprises: clamps 1 and 2 connected externally in a watertight manner by sleeve 3, with suitable inserted seals 4,5. The two clamps 1, 2 are internally identical so that each may receive, in a known manner, one end of an optical fiber cable.

Each clamp receives on its internal end, a slack chamber 15, 16. In between the chambers is a mandrel 17 provided with radial ports 18, 19.

The internal end of each clamp, visible in FIG. 2, consists of a cylindrical cavity 7, 8 which may, for instance, accommodate washers 11, 12, a longitudinal sealing passage member 13, 14 and the tubular slack chambers 15, 16. The inner periphery of the internal ends of the clamps 1, 2 are provided with threads as at 1a, 2a respectively which threadably engage threads 15d, 16d of small diameter portion 15a, 16a of the tubular slack chambers 15, 16. The chambers 15, 16 also include radially enlarged diameter portions 15b, 16b. The tubular slack chambers 15, 16 have internally, radially outwardly flared surfaces 15c, 16c leading from the small diameter portions 15a, 16a to the radially enlarged diameter portions 15b, 16b, respectively. The axially length of the mandrel 17 is in excess of the distance between the ends of the radially enlarged diameter portions 15b, 16b of tubular slack chambers 15, 16. Further the mandrel 17 includes a small diameter portion 17a intermediate of it's ends, and at it's ends are constituted by radial flanges 17b, 17c respectively. Flange 17b includes an annular recess 17d at it's outer periphery and adjacent that end of the mandrel, while flange 17c includes a peripheral annular recess 17c. These recesses receive the ends of the small diameter portions 15b, 16b respectively of tubular slack chambers 15, 16. Further, screws 20 are employed for coupling the small diameter portions 15b, 16b of tubular slack chambers 15, 16 to flanges 17b, 17c of mandrel 17. The flanges 17b, 17c define with the tubular slack chamber 15, 16 annular cavities 21, 22 for storing the optical fiber strands within slack chamber 15, 16 in coil fashion without forming either folds, bends, or small radius as shown by portions of fibers B1, B2, FIG. 2. A longitudinal seal is obtained by threading the fibers in calibrated openings rendered watertight by means of glue.

In between slack chambers 15, 16 is inserted a hollow mandrel 17 provided with an array of radial ports 18, 19 adjacent each of its ends.

A joining operation proceeds as follows:

After securing a lamp to the end of each cable, having previously taken the precaution to insert the connecting sleeve 3 on the correct side and in the correct direction, the sealing passage members 13, 14 are installed. Said operations being entirely conventional in themselves.

Next the slack chambers 15, 16 are positioned and the ends of the two cables are mechanically clamped by means of mandrel 17, which may be typically inserted and secured by means of screws.

An optical fiber $A_1$ of the left hand cable is taken out and threaded through port 18 on the mandrel and led to the outside, for welding to fiber $A_2$ of the right hand cable which has been taken out in the same manner and led through port 19. Previously, the cables have been stripped over a sufficient length leaving strands $A_1$ and $A_2$ sufficiently long to permit easy manipulation and welding. One such weld has been shown at A₁₂.

Once the weld is completed and strengthened, the strands are pushed back into slack chambers 15, 16 where they may be coiled without forming either folds or bends or small radius, and are then applied against the walls of the chamber where they may be glued or fastened in some appropriate manner (by screws, hooks, etc). One such weld has been shown at A₁₂; connecting the optical fibers B₁ and B₂, of which the excess lengths are tucked inside the respective slack chambers.

Once the fibers have been properly tucked in, the tubular sleeve 3 is installed ans is secured typically by screwing, as illustrated.

The internal space is insulated in a watertight manner by seals 4, 5 between the sleeve and the clamps, and by the longitudinal watertight passage members 13, 14.

The junction box thus constructed is simple and safe, is easy to install, and the fashioning of the junction calls for no special aptitude other than that required for welding. The positioning of the fibers take place automatically.

We claim:

1. In a junction box for joining the ends of two optical fiber underwater cables by welding, said junction box comprising two clamps 1, 2, a watertight tubular sleeve 3, a central hollow mandrel 17, said clamps clamping the ends of the cables connected together by said watertight tubular sleeve 3 and said central hollow mandrel 17 for securing the welds, said mandrel 17 having opposed ends and radial ports 18, 19 adjacent said ends, respectively, for threading the optical fibers from inside to outside, the improvement wherein a slack chamber 15, 16 is positioned between each clamp and a respective end of the mandrel, and the axially internal end of each clamp having a cylindrical cavity 7, 8 provided with fastening means for mounting a slack chamber.

2. The junction box according to claim 1, wherein said fastening means are screw threads on the interior of the internal end of each clamp and on the exterior of each slack chamber.

3. The junction box according to claim 1, wherein a longitudinal watertight passage member 13, 14 is located adjacent the end of the slack chamber in each clamp and within the clamp cylindrical chamber 7, 8.

4. The junction box according to claim 1 wherein said slack chambers comprise tubular members, each including a small diameter portion mounted internally within said cylindrical cavity of a respective clamp, and an integral radially enlarged diameter portion extending axially beyond said cylindrical cavity, said mandrel terminates in radially enlarged flanges at opposite ends thereof, said flanges including annular recesses within the periphery thereof at the end of the flanges facing said slack chambers, and wherein the interior surface of the slack chamber tubular member is flared outwardly in the direction leading from the small diameter portion thereof to the radially enlarged diameter portion such that annular cavities are formed between the ends of the mandrel flanges and the outwardly flared interior surface of the tubular slack chamber to facilitate coiling of the slack portions of the optical fibers without small diameter radius bends to protect against breakage or damage of the optical fibers when positioned therein.

5. The junction box according to claim 2 wherein said slack chamber comprise tubular members including a small diameter portion mounted internally within said cylindrical cavity of a respective clamp, and an integral radially enlarged diameter portion, and wherein said mandrel terminates in radially enlarged flanges at opposite ends thereof, said flanges including annular recesses within the periphery thereof at the end of the flanges facing said slack chambers, and wherein the interior surface of the slack chamber tubular member is flared outwardly in the direction leading from the small diameter portion thereof to the radially enlarged diameter portion such that annular cavities are formed between the ends of the mandrel flanges and the outwardly flared interior surface of the interior tubular slack chamber to facilitate coiling of the slack portions of the optical fibers without small diameter radius bends to protect against breakage or damage of the optical fibers when positioned therein.

* * * * *